(12) United States Patent
Bruillard et al.

(10) Patent No.: US 9,471,871 B2
(45) Date of Patent: Oct. 18, 2016

(54) METHOD OF GENERATING FEATURES OPTIMAL TO A DATASET AND CLASSIFIER

(71) Applicant: BATTELLE MEMORIAL INSTITUTE, Richland, WA (US)

(72) Inventors: Paul J. Bruillard, West Richland, WA (US); Luke J. Gosink, Richland, WA (US); Kenneth D. Jarman, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 510 days.

(21) Appl. No.: 14/186,740

(22) Filed: Feb. 21, 2014

(65) Prior Publication Data
US 2015/0242759 A1    Aug. 27, 2015

(51) Int. Cl.
*G06N 3/12*    (2006.01)

(52) U.S. Cl.
CPC .................................... *G06N 3/126* (2013.01)

(58) Field of Classification Search
CPC ................................................ G06N 3/126
See application file for complete search history.

(56) References Cited

U.S. PATENT DOCUMENTS

| 2008/0109392 A1* | 5/2008 | Nandy | G06N 5/025 706/47 |
| 2013/0223694 A1* | 8/2013 | Ricanek, Jr. | G06K 9/00221 382/118 |

OTHER PUBLICATIONS

Couchet et al, Crossover and mutation operators for grammar-guided genetic programming, 2006.*
Lin et al, Object Detection via Feature Synthesis Using MDL-Based Genetic Programming, 2005.*
Smith et al, Genetic Programming with a Genetic Algorithm for Feature Construction and Selection, 2005.*
Leather, H., et al., Automatic Feature Generation for Machine Learning Based Optimizing Compilation, 2009 International Symposium on Code Generation and Optimization, doi:10.1109/CGO.2009.21, 81-91.
De Silva, A. M., Grammar Based Feature Generation for Time-Series Prediction, School of Electrical Information Engineering at the University of Sydney, Nov. 2013.

* cited by examiner

*Primary Examiner* — Stanley K Hill
*Assistant Examiner* — Mikayla Chubb
(74) *Attorney, Agent, or Firm* — Derek H. Maughan

(57) ABSTRACT

A method of generating features optimal to a particular dataset and classifier is disclosed. A dataset of messages is inputted and a classifier is selected. An algebra of features is encoded. Computable features that are capable of describing the dataset from the algebra of features are selected. Irredundant features that are optimal for the classifier and the dataset are selected.

16 Claims, 8 Drawing Sheets

$$\begin{bmatrix} 1 & 0 & 0 \\ 1 & 0 & 0 \\ 1 & 1 & 1 \end{bmatrix} \quad \begin{bmatrix} 1 & 1 & 1 \\ 1 & 0 & 1 \\ 1 & 0 & 1 \end{bmatrix}$$
Letter 'L'     Letter 'n'
Figure 4A
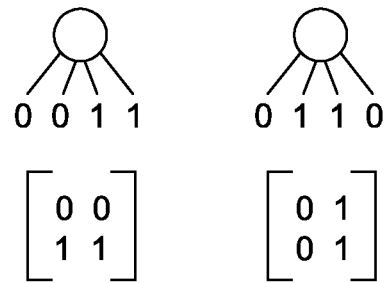
Figure 4B
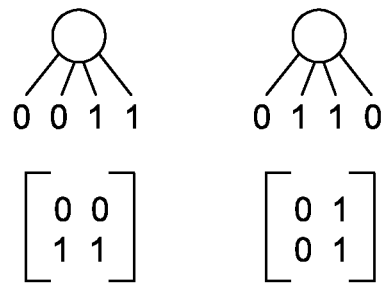
Figure 4C
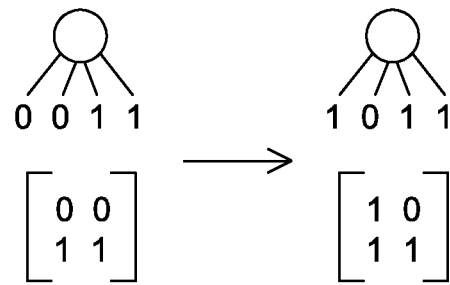
Figure 4D

METHOD OF GENERATING FEATURES OPTIMAL TO A DATASET AND CLASSIFIER

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to machine learning. More specifically, this invention relates to a method of producing an optimal set of features for a given dataset and classifier.

BACKGROUND OF THE INVENTION

In machine learning, users are often interested in understanding how to classify data given examples of previously classified data (a training set). Many algorithms have been devised to tackle this problem and each has its strengths and weaknesses. Nonetheless, many if not all machine learning systems process features rather than the raw data. For example, a piece of fruit can be classified as an orange or an apple. A salient feature for classification might be the color of the fruit.

Despite the importance of features in classification, most algorithms require that the user specify the features that should be utilized. While this may not appear to be an obstacle, people are typically bad at selecting important irredundant features from large complex data sets. Similarly, feature selection (removal of redundant features) is typically accomplished after feature generation, not in tandem with it. Furthermore, human selection is time consuming and very subjective—often performed by selecting features that a human may use to perform classification rather than what might be useful to the underlying classification algorithm.

SUMMARY OF THE INVENTION

The present invention is directed to methods of generating features optimal to a particular dataset and classifier. In one embodiment, the method includes inputting a dataset of messages; inputting a classifier; encoding an algebra of computable features capable of describing the data set; selecting computable irredundant features from the algebra of features which are optimal for the classifier and the dataset.

In one embodiment, the method further comprises randomly selecting a first subset of the computable features and inputting them into the classifier.

In one embodiment, the method further comprises determining accuracy of the classifier using a validation set and each feature independently.

In one embodiment, the method further comprises randomly selecting a second subset of features from the first subset of computable features.

In one embodiment, the method further comprises mutating the second subset of features.

In one embodiment, the method further comprises randomly selecting pairs of features from the first subset of computable features.

In one embodiment, the method further comprises applying crossing to each selected pair of features from the first subset of computable features.

In one embodiment, the method further comprises combining the first subset of computable features, the mutated features, and the crossed features to generate a third subset of features.

In one embodiment, the method further comprises selecting a fourth subset of features from the algebra of features and adding to the third subset of features.

In one embodiment, the method further comprises removing duplicate features from the third subset of features.

In one embodiment, the method further comprises inputting the features from the third subset into the classifier and computing accuracy of the classifier for each feature using a validation set.

In one embodiment, the method further comprises ranking the features of the third subset by their corresponding classifier accuracy.

In one embodiment, the method further comprises maintaining only fittest features from the third subset to form a fifth subset of the same size as the first subset, and replacing the first subset with the fifth subset.

In one embodiment, the method further comprises repeating the mutating, the crossing, the removing, the ranking, the selecting, and the maintaining until accuracy of a most fit feature converges, wherein the most fit feature is cached.

In another embodiment of the present invention, a method of generating irredundant features optimal to a particular dataset and classifier is disclosed. The method includes inputting a dataset of messages; inputting a classifier; encoding an algebra of computable features capable of describing the dataset through expression trees; and applying a genetic algorithm to select a resulting feature which maximizes accuracy of the classifier given a validation set.

In one embodiment of the present invention, the features are encoded as grammar trees utilizing a BNF grammar or a Chomsky grammar.

In one embodiment, the resulting feature is cached and the algorithm iteratively reapplied to determine a set of irredundant features maximizing classifier accuracy for the dataset. The classifier utilizes the cached feature and a candidate feature when computing accuracy

BRIEF DESCRIPTION OF THE DRAWINGS

FIG. 4A shows two 3×3 matrices of pixel representations for each letter.

FIG. 4B shows a first subset of computable features using two trees and matrices.

FIG. 4C shows a ranking of the features which correspond to accuracy of the selected classifier.

FIG. 4D shows a mutation step that changes a pixel from each matrix.

DETAILED DESCRIPTION OF THE PREFERRED EMBODIMENTS

The present invention is directed to methods of generating features optimal to a particular dataset and classifier by iteratively applying genetic algorithms. The present invention improves the accuracy of standard machine learning algorithms by extracting salient features from the data and selecting irredundant features. The present invention allows a user to select a classifier or classification scheme and a set of fixed input features that must be used when determining classifier accuracy.

In one embodiment, elements of this algebra of features are encoded through grammar trees specified by a BNF grammar or a Chomsky grammar. The trees are uniformly randomly generated and a genetic algorithm is applied to select a feature which maximizes the accuracy of a user specified classifier given a training set and a validation set. The resulting feature is cached and the algorithm is reapplied to determine the most efficient feature given the features determined in the earlier steps. Given sufficient time, the algorithm will always converge and produce the optimal set of features for a given dataset and classifier.

Figure 1:
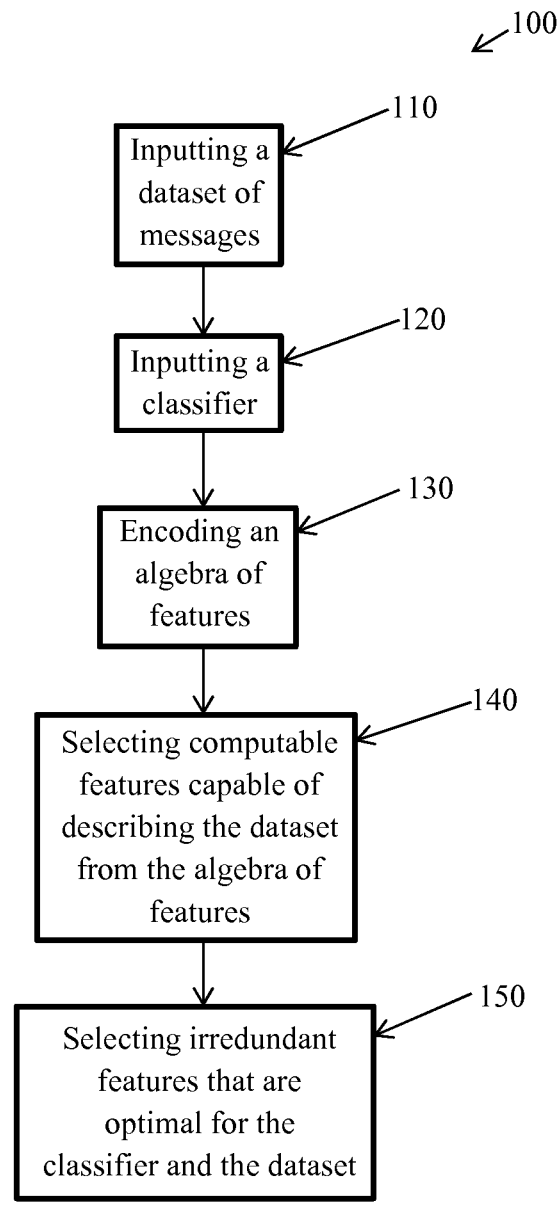
FIG. 1 is a flowchart of a method of generating features optimal to a particular dataset and classifier, in accordance with one embodiment of the present invention.

FIG. 1 is a flowchart 100 of a method of generating features optimal to a particular dataset and classifier, in accordance with one embodiment of the present invention. At 110, a dataset of messages is inputted. The messages are constructed from discrete values such as integers and/or letters. At 120, a classifier is inputted. The classifier may be a user selected classifier or classification scheme. At 130, an algebra of features is encoded. This algebra is used mathematically to add, subtract and/or multiply features and multiply by coefficients. At 140, computable features are selected that are capable of describing the dataset from the algebra of features. The computable features include the use of coefficients that must be computable numbers, such as finite precision numbers, and also refers to the depth of grammar trees. The features selected are non-constant on the dataset of messages. At 150, irredundant features are selected that are optimal for the classifier and the dataset.

The method may further include randomly selecting a first subset of the computable features and inputting them into the classifier.

The accuracy of the classifier may be determined using a validation set. The inputted dataset can be split into a validation set and a training set.

The method may further include randomly selecting a second subset of features from the first subset of computable features. This selection is performed randomly with a features probability being proportional to the accuracy of the corresponding classifier.

The second subset of features may be mutated in an attempt to improve fitness of the features. For example, given a feature encoded as an expression tree, a node in the tree may be picked and replaced with a compatible node in accordance with an underlying grammar.

The method may also include randomly selecting pairs of features from the first subset of computable features and applying crossing to each selected pair of features. This selection process is also proportional to the feature accuracy. As an example, a node from one feature and a node from another feature are selected such that the nodes are compatible, and the two sub-trees rooted at the selected nodes are swapped in an attempt to improve feature fitness. The nodes are selected in accordance with an underlying grammar to ensure that the resulting trees form valid expressions.

The method may further include combining the first subset of computable features, the mutated features, and the crossed features to generate a third subset of features. Duplicate features are removed from the third subset of features. This removing step is performed, for example, to remove a feature that is the same as another feature in the set.

The features from the third subset may be inputted into the classifier, wherein the accuracy of the classifier is computed. This allows the features of the third subset to be ranked by their corresponding classifier accuracy. For example, a list of features may include a feature at the top of the list that is the "most fit" feature, the second to the top feature that is the next "most fit" feature, and so on. Any ties in the ranking are broken based on a total order so that there is no ambiguity left. For example, ties can be broken between two integers if one is less than the other.

The method may further include maintaining only the fittest features from the third subset to form a fourth subset of the same size as the first subset, and replacing the first subset with the fourth subset.

The previous steps above—the mutating, the crossing, the removing, the ranking, and the maintaining steps—maybe repeated until accuracy of the most fit feature converges. The most fit feature is added to a fifth subset of features, which was constructed to use in the iterative process of constructing irredundant features. These iterations occur until the most fit feature for a selected classifier is determined.

Figure 2:
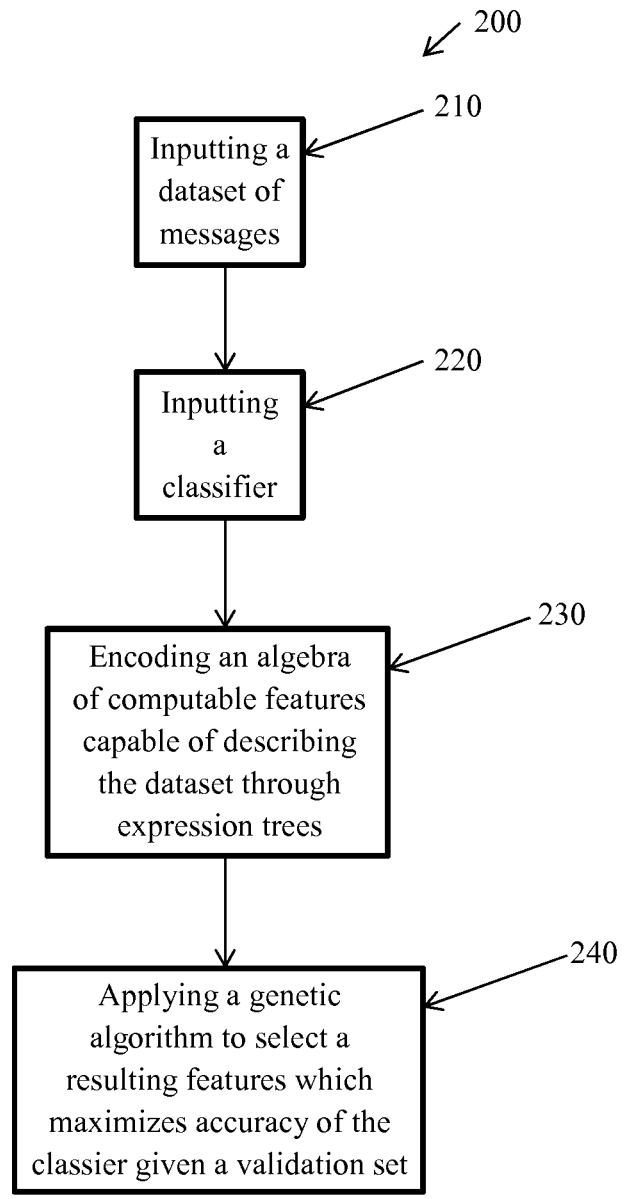
FIG. 2 is a flowchart of a method of generating features optimal to a particular dataset and classifier, in accordance with one embodiment of the present invention.

FIG. 2 is a flowchart of a method of generating features optimal to a particular dataset and classifier, in accordance with one embodiment of the present invention. At 210, a dataset of messages is inputted. At 220, a classifier is inputted. At 230, an algebra of computable features capable of describing the dataset through expression trees is encoded. The trees may be specified by a BNF grammar or a Chomsky grammer. At 240, a genetic algorithm is applied for selecting a resulting feature which maximizes accuracy of the classifier given a validation set.

Example 1

The following examples serve to illustrate certain embodiments and aspects of the present invention and not to be construed as limiting the scope thereof.

As one example, the present invention can be used to determine if a person is obese—or classified as obese or not obese. The dataset can include features extracted from medical records. These features can include, but not limited to, height, weight, ape index, ethnicity, hair color, and age. Alternatively, a user can select which features to use that are relevant to obesity. The user also selects a classifier.

Figure 3A:
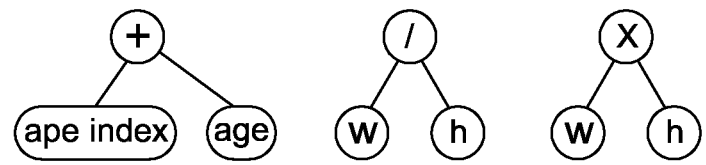
FIG. 3A shows a first subset of computable features using three expression trees.

Expression trees specified by a BNF grammar are used to describe and combine the features. FIG. 3A illustrates a first subset of computable features using three expression trees. The first expression tree on the left adds ape index to age. The second expression tree in the middle takes weight and divides by height. The third expression tree on the right multiplies weight by height.

Figure 3B:
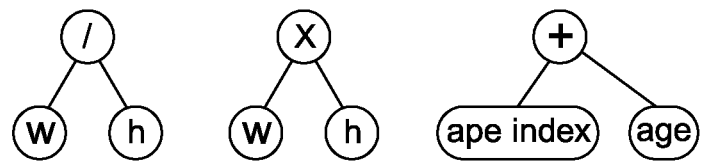
FIG. 3B shows a ranking of the features which corresponds to accuracy of the selected classifier.

FIG. 3B shows a ranking of the features which corresponds to accuracy of the selected classifier. The expression tree on the left—weight divided by height—was highest ranked or most relevant to obesity from the first subset of features, while the expression tree on the right—ape index added to age—was the least useful for obesity from the same subset.

Figure 3C:
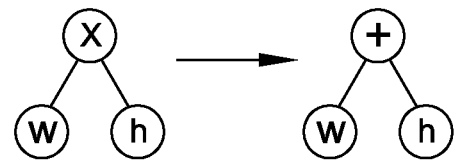
FIG. 3C shows a mutation step multiplying the weight and height, which changes multiplication to addition.

A second subset from the first subset of features is selected. In this example, the features of the expression tree multiplying the weight and height is randomly selected and then mutated. The mutation process changes multiplication to addition. This is shown in FIG. 3C.

Pairs of features from the first subset of computable features (from FIG. 3A) are selected, and crossing is applied to the selected pair of features. The selected pairs are shown on the left of FIG. 3D, and the resulting pair from the crossing step—where nodes of the trees are swapped—is shown on the right of FIG. 3D.

Figure 3D:
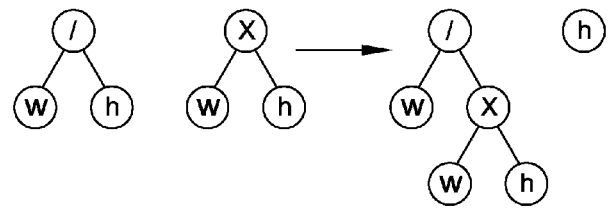
FIG. 3D shows a crossing step applied to a selected pair of features.
Figure 3E:
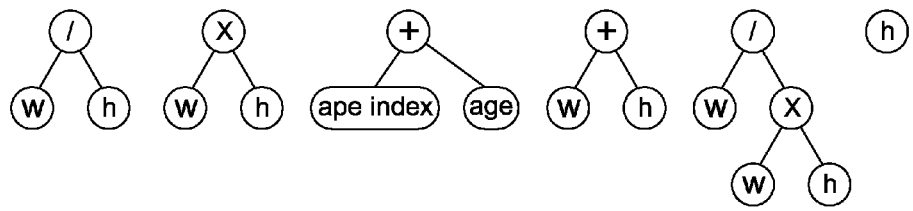
FIG. 3E shows a third subset of features comprising the first subset of computable features (from FIG. 3A), the mutated features (from FIG. 3C), and the crossed features (from FIG. 3D).

FIG. 3E shows a third subset of features comprising the first subset of computable features (from FIG. 3A), the mutated features (from FIG. 3C), and the crossed features (from FIG. 3D).

Figure 3F:
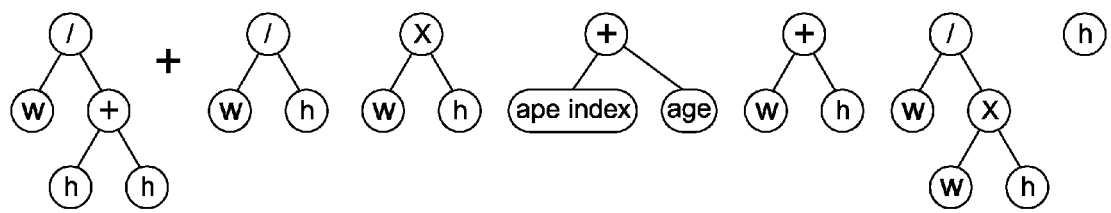
FIG. 3F shows the third subset of features after adding a randomly selected computable feature, the fourth subset, to the third subset of features.

FIG. 3F shows the third subset of features after adding a randomly selected computable feature, the fourth subset, to the third subset of features.

Figure 3G:
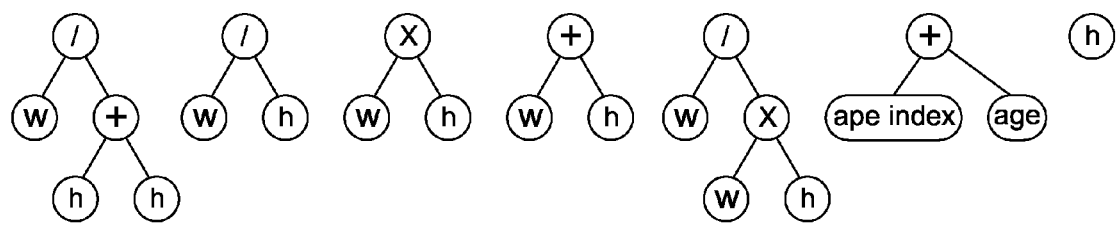
FIG. 3G shows a ranking of the third subset of features by their corresponding classifier accuracy.

The third subset of features is ranked by their corresponding classifier accuracy. The ranking from best to worst—left to right—is shown in FIG. 3G.

Duplicate features, if any, are removed from the third subset of features. In this manner, ties are broken based on a total order. For example, the two left most trees—w/(2 h) and w/h—are compared. Since 2 is less than h in our total order, the ties are resolved in favor of the left most tree (w/2 h).

Figure 3H:
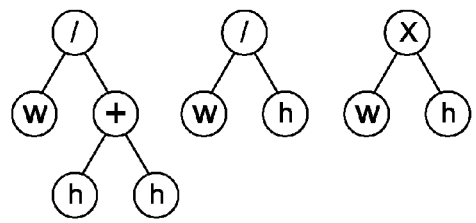
FIG. 3H shows a fifth subset of features which comprises only the three fittest features from the third subset.

A fifth subset is shown in FIG. 3H. This fifth subset is the same size as the first subset (three trees as shown in FIG. 3A) and comprises only the three fittest features from the third subset.

The process is repeated until accuracy of a most fit feature converges, which is then cached. This results in the most fit feature—$w/h^2$—for determining obesity, which happens to be BMI.

Example 2

As another example, the present invention can be used for optical character recognition (e.g. handwriting recognition). FIG. 4A shows two 3×3 matrices of pixel representations for the letter L and the letter n. The pixels of the two binary images are 0's and 1's. This means that each pixel in the matrix is stored as a single bit—i.e., a 0 or a 1. The two matrices correlate to the dataset of messages for this example.

Trees which encode matrices are used to describe and combine the features. FIG. 4B illustrates a first subset of computable features consisting of two expression trees depicted with their corresponding matrices. The first tree and matrix on the left includes two 0s or black pixels and two 1s or white pixels. The second tree and matrix on the right also includes two 0 pixels and two 1 pixels but in a different configuration or order.

FIG. 4C shows a ranking of the features which correspond to accuracy of the selected classifier. The tree and the matrix on the left—with pixel order of 0011—was highest ranked or more relevant to character recognition from the first subset of features, while the tree and matrix on the right was less useful for character recognition from the same subset.

The rankings are determined from the convolution. In this case the results of the two matrices in FIG. 4B are the same (i.e., they are tied). The order is then chosen based on a total order. In this case—reading the tree along the bottom—0011 is lower in dictionary order than 0110 and so it comes first.

Figure 4E:
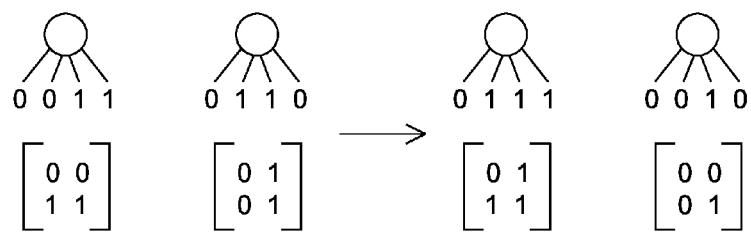
FIG. 4E shows a crossing step applied to the matrices.

The mutation changes the first pixel of the first tree from 0 to 1, as shown in FIG. 4D. Crossing is applied to the first subset of features. The second pixel of each tree or matrix is swapped, as shown in FIG. 4E.

Figure 4F:
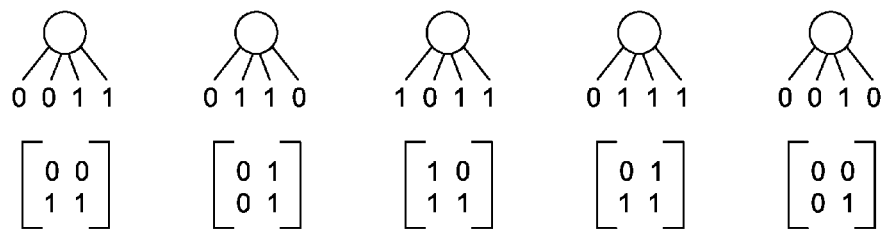
FIG. 4F shows a third subset of features comprising the first subset of features, the mutated features, and the crossed features.

FIG. 4F shows a third subset of features comprising the first subset of features (from FIG. 4B), the mutated features (from FIG. 4D), and the crossed features (from FIG. 4E).

Figure 4G:
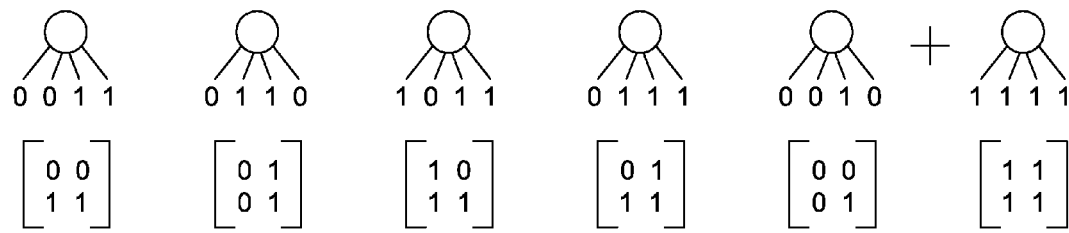
FIG. 4G shows the third subset of features after adding a randomly selected computable feature, the fourth subset, to the third subset of features.

FIG. 4G shows the third subset of features after adding a randomly selected computable feature, the fourth subset, to the third subset of features.

Figure 4H:
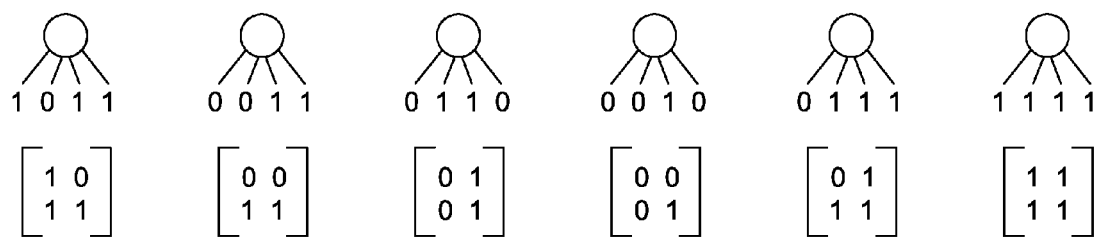
FIG. 4H shows a ranking of the third subset of features by their corresponding classifier accuracy.

The third subset of features is ranked by their corresponding classifier accuracy. The ranking from best to work—left to right—is shown in FIG. 4H. Duplicate features, if any, are removed from the third subset of features.

Figure 4I:
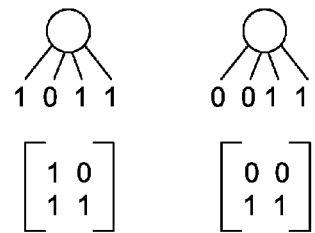
FIG. 4I shows a fifth subset of features which comprises only the two fittest features from the third subset.

A fifth subset is shown in FIG. 4I. This fifth subset is the same size as the first subset (two trees/matrices as shown in FIG. 4B) and comprises only the two fittest features from the third subset. As can be noticed from the matrices of FIG. 4I, the matrix on the left '1011' resembles the letter 'L' more than the matrix on the right with pixel order '0011'.

The process can be repeated until accuracy of a most fit feature converges, which is then cached.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of generating irredundant features optimal to a particular dataset and classifier, comprising:
    a. inputting a dataset of messages;
    b. inputting a classifier;
    c. encoding an algebra of computable features capable of describing the dataset through expression trees; and
    d. applying a genetic algorithm to select a resulting feature which maximizes accuracy of the classifier given a validation set.

2. The method of claim 1 wherein the resulting feature is cached and the algorithm iteratively reapplied to determine a set of irredundant features maximizing classifier accuracy for the dataset, wherein when computing accuracy the classifier utilizes the cached features and a candidate feature.

3. The method of claim 1 wherein the trees are specified by a BNF grammar or a Chomsky grammar.

4. The method of claim 1 further comprising randomly selecting a first subset of the algebra of computable features and inputting them into the classifier.

5. The method of claim 4 further comprising randomly selecting a second subset of features from the first subset of computable features.

6. The method of claim 5 further comprising mutating the second subset of features.

7. The method of claim 6 further comprising randomly selecting pairs of features from the first subset of computable features.

8. The method of claim 7 further comprising applying crossing to each selected pair of features from the first subset of computable features.

9. The method of claim 8 further comprising combining the first subset of computable features, the mutated features, and the crossed features to generate a third subset of features.

10. The method of claim 9 further comprising selecting a fourth set of features from the algebra of features and adding to the third subset of features.

11. The method of claim 10 further comprising removing duplicate features from the third subset of features.

12. The method of claim 11 further comprising inputting the features from the third subset into the classifier and computing accuracy of the classifier.

13. The method of claim 12 further comprising ranking the features of the third subset by their corresponding accuracy.

14. The method of claim 13 further comprising breaking ties, if any, in the ranking based on a total order.

15. The method of claim 14 further comprising maintaining only fittest features from the third subset to form a fifth subset of the same size as the first subset, and replacing the first subset with the fifth subset.

16. The method of claim 15 further comprising repeating the mutating, the crossing, the removing, the ranking, the selecting, and the maintaining until accuracy of a most fit feature converges, wherein the most fit feature is cached.

* * * * *